United States Patent Office 3,087,627
Patented Apr. 30, 1963

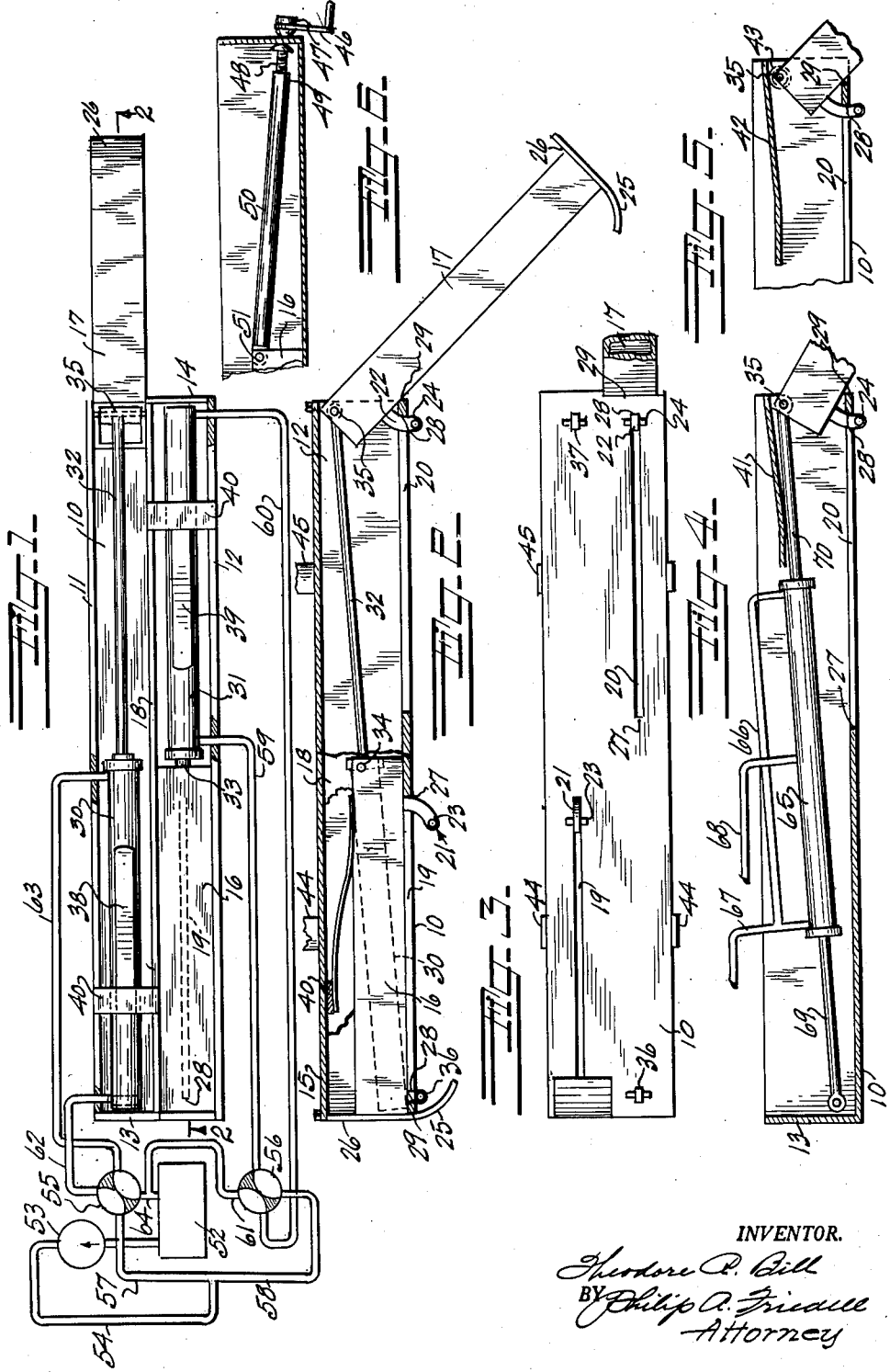

3,087,627
LEVELING AND BRACING LEGS FOR VEHICLES
Theodore R. Bill, 415 San Leandro Blvd.,
San Leandro, Calif.
Filed Oct. 16, 1961, Ser. No. 145,249
4 Claims. (Cl. 212—145)

This invention relates to improvements in out-rigger devices for leveling, bracing, and supporting a portion, such as the rear end of a vehicle, to provide rigid, leveled support for operation of a derrick or other apparatus mounted on the vehicle, and provides an apparatus of this nature which can be mounted at either end or centrally of the length of the vehicle, and one which is completely retractable within the span of the width of the vehicle, is completely enclosed when retracted and thus sealed against intrusion of dust, mud, or other foreign material and therefore always ready for use when required, and one which can be operated manually or through a source of power.

The objects and advantages of the invention are as follows:

First, to provide lateral support and bracing means for a vehicle and which support and bracing means is completely retractable within the transverse span of the vehicle.

Second, to provide apparatus as outlined in which opposed legs are completely retractable within a housing mounted on the frame of the vehicle.

Third, to provide apparatus as outlined with selective operating and control means to provide for leveling of the vehicle.

Fourth, to provide apparatus as outlined in which the legs are projected the greater portion of their travel in the instant plane followed by declination during the final portion of travel to the supporting surface for the vehicle and continuing with angular retraction to transfer the load of the vehicle from its wheels to the legs.

Fifth, to provide apparatus as outlined which is completely enclosed against ingress of foreign matter when the legs are fully retracted within the housing.

Sixth, to provide apparatus as outlined which is of the simplest possible construction, positive in operation, involving an absolute minimum number of parts, and therefore economical to construct.

In describing the invention reference will be had to the accompanying drawings, in which:

FIG. 1 is a top plan view of the invention with the top cover removed and with one leg in leveling and supporting position.

FIG. 2 is a side elevation of FIG. 1 shown in stepped section and taken on line 2—2 of FIG. 1, with the legs shown solid.

FIG. 3 is a bottom view of the invention, with the extended leg broken away.

FIG. 4 is a sectional elevation showing a modification using a floating cylinder for minimizing the bending or collapsing effect and using opposed plungers for excessive motor stroke requirements, and making it possible to use lighter plungers.

FIG. 5 fragmentarily illustrates a modification of the planar retaining means in vertical section.

FIG. 6 fragmentarily illustrates a modification of the operating means for manual operation.

The invention includes a housing having a bottom wall 10, front and back walls 11 and 12, half end walls 13 and 14, and if desired, a cover plate 15, which is to be removable at will.

The housing has a depth, front to back, slightly greater than twice the width of one of the legs 16, 17. The central wall 18 is optional, as guide slots 19 and 20 are provided in the opposite end portions and respective sides of the bottom 10 of the housing, for the combined guides and fulcrums, the fulcrums consisting of an outwardly curved arm as indicated at 21 and 22, and depending from the bottom of the leg adjacent the inner end and projecting through slots 19 and 20 formed through the bottom wall of the housing and which slots terminate in spaced relation to the outer end of the bottom wall to form stops, and each arm having a cross member 23 and 24, and which are shown as pins passing through the lower portions of the arms 21 and 22, beneath the bottom wall, as shown.

The legs 16 and 17 may be of any suitable cross-sectional form and are shown as rectangular in cross section and are provided with a curved shoe 25, the upper end of which extends upwardly to close the upper portion of the housing as indicated at 26.

The combined guide and fulcrum is fixed to the underside of the leg in spaced relation to the inner end of the leg, and the slot extends from the point of complete retraction at 27 to a point 28 in spaced relation to the outer end of the bottom wall to provide a stop and is so spaced as to permit the leg to swivel about the end 29 of the bottom wall.

Fluid motors are preferred for operation and may be selectively or simultaneously controlled, and each consists of a cylinder 30, 31, each having a plunger rod 32, 33, which is pivotally connected to the upper portion of the inner end of the leg as indicated at 34, 35; the cylinders being preferably pivoted through the medium of depending lugs 36, 37, projecting through a passage formed through the bottom wall, providing the most economical method of anchoring, though not so limited.

It is preferable to have the legs travel in the instant plane until the combined guide and fulcrum at least closely approaches the stop, for which reason a suitable holddown is provided, and which, in FIGS. 1 and 2, consists of a leaf spring 38, 39, having one end fixed to a cross member 40, which may span the entire housing, or may span only one half if a support or central partition is provided, the other end of the spring cooperating with the cylinder. However, instead of a holddown spring, a suitable guide may be provided, as shown at 41 in FIG. 4, and at 42 in FIG. 5, the latter also including a roller 43 to ease retraction. Suitable mounting means is provided if the housing is not formed integral with the vehicle, such as the hanger bars 44 and 45.

FIG. 6 is merely included to show that the legs can be operated by other sources of power, such as by a crank 46 provided with a ratchet 47 and operating a screw 48 which is threaded in the adjacent end portion of the screw housing 50, as indicated at 49, the housing 50 having a pivotal connection 51 to the upper portion of the inner end of the leg.

The legs can be operated simultaneously or selectively, the circuit being shown for selective operation to permit leveling of the vehicle.

The fluid supply 52 is delivered by the pump 53 through the line 54 to the respective valves 55 and 56 through the branches 57 and 58.

As shown, valve 56 is delivering fluid to the inner end of cylinder 31 through the line 59, with the outer end of the cylinder open through the line 60 to the valve 56 and thence through the line 61 to the sump 52, and is thus controlled for retraction of the leg, while valve 55 delivers fluid through the line 62 to the outer end of the cylinder 30, projecting the leg outwardly and thence to the declined position shown in FIG. 2, the final movement retracting the shoe inwardly toward the vehicle and thereby elevating that side of the vehicle; the inner end of this cylinder having connection through the valve 55 to the sump by the connections 63 and 64. By reversing the valve 56, the leg 16 will be projected, thus this apparatus provides perfect control for elevating, leveling, and supporting the vehicle.

This invention is disclosed but not claimed except in combination with the maintenance unit covered in my copending application Serial Number 140,766 filed September 26, 1961.

Where the stroke of a fluid motor is excessively long, a floating cylinder, indicated at 65, will provide far greater strength and prove more economical to manufacture, as all parts can be made lighter and of smaller dimensions. The respective ends of the cylinder are connected in parallel as indicated by the tubular lines 66 and 67, for retraction, and a third connection 68 is in communication at the midway point, for projection of the leg, the plunger rods 69 and 70 being only half the length of that used in the anchored cylinder.

Thus outrigger braces are provided with which a vehicle can be elevated, leveled, supported, and braced for operation of derricks and similar apparatus mounted on the vehicle, and thus insuring efficient operation of the apparatus, and safety for the workers.

I claim:

1. In outrigger support means for a vehicle having a derrick or the like mounted thereon, and including a housing having a bottom wall and transversely mounted on said vehicle, a pair of opposed legs having each an inner end and an outer end, a top and a bottom, and slidable in opposition and in parallel on said bottom wall, and opposed fluid motors operatively connected between the housing and the respective legs,
   means for declining said legs when projected for cooperation with the supporting surface for the vehicle comprising
   a combined guide and fulcrum depending from the inner end of each leg and
   projecting through a slot formed through the bottom wall for each combined guide and fulcrum, with the slot extending from the point of maximum retraction of the leg to a point in slightly spaced relation from the terminal ends of the housing bottom wall to form a stop, with the
   fluid motors having operative connection with the top portion of the inner end of each leg, and
   thereby providing leverage for swinging the legs to a declined position about the fulcrum followed by retraction of the outer ends of the legs inwardly toward the longitudinal axis of the vehicle for transferring the load of the vehicle to the legs.

2. A structure as defined in claim 1, holddown means comprising a spring for each fluid motor and cooperative between the fluid motors and the housing for
   maintaining the legs in substantial contact with the bottom wall during projection of the legs to engagement of said combined guide and fulcrum with the stops, with further projection of the legs pivoting the inner ends of the legs about the fulcrums for
   declination and inward retraction to supporting position for the vehicle.

3. In outrigger support means for a vehicle having a derrick or the like mounted thereon, and including a pair of opposed parallel legs having each an inner end, an outer end, a top and a bottom, a housing mounted transversely on said vehicle and having a bottom wall, and having front and back walls spaced in excess of the diameters of the legs, a fluid motor for each leg and operatively connected between the housing and the leg,
   means for deflecting the legs and inwardly retracting the outer ends inwardly toward the longitudinal axis of the vehicle comprising
   a combined guide and fulcrum depending from the inner end of each leg and
   projecting through and slidable in slots formed through said bottom wall, with each slot terminating in slightly spaced relation to the said outer ends of the housing to form stops for engagement with said fulcrums at the terminal of projection of the legs for pivoting of the inner end of the tops of the legs thereabout,
   with the fluid motor having connection to the top portion at the inner end of each leg
   for forcing the inner end of the leg about the pivotal fulcrum,
   for elevating, leveling, supporting, and bracing the vehicle against off-balance loads.

4. In combined elevating, leveling, supporting, and bracing means for a vehicle including a housing transversely mounted on the vehicle and having a bottom wall and terminal ends, and a pair of opposed legs slidably operable in opposition and in parallel in said housing and each having an inner end and an outer end and a top and a bottom,
   means for declining said legs and retracting the legs inwardly toward the longitudinal axis of the vehicle comprising
   a fulcrum depending from the inner end of each leg and
   slidable in a slot formed through said bottom wall,
   advancing and retracting means cooperative between the inner end at the top of each leg and the housing, with the slots terminating adjacent the outer end of the bottom wall to form pivotal stops for
   cooperation with the fulcrums at the terminal of advancement of the legs, with the
   top of each leg pivoting about the stop, declining the leg and retracting the outer end of the leg toward the longitudinal axis of the vehicle for transfer of the load of the vehicle to the legs.

References Cited in the file of this patent
UNITED STATES PATENTS

| Re. 24,482 | Felkner | June 3, 1958 |
| 2,672,319 | Nelson | Mar. 16, 1954 |
| 2,752,056 | Lull | June 26, 1956 |
| 2,777,586 | Boysen et al. | Jan. 15, 1957 |
| 3,021,015 | Bowman | Feb. 13, 1962 |